(12) United States Patent
Cooperman et al.

(10) Patent No.: US 8,957,780 B2
(45) Date of Patent: Feb. 17, 2015

(54) SYSTEM FOR REMOTELY MONITORING CHANGES IN CONDITION

(76) Inventors: Isadore Cooperman, Freehold, NJ (US); Robert Geissler, Little Silver, NJ (US)

( * ) Notice: Subject to any disclaimer, the term of this patent is extended or adjusted under 35 U.S.C. 154(b) by 256 days.

(21) Appl. No.: 13/544,349

(22) Filed: Jul. 9, 2012

(65) Prior Publication Data
US 2013/0038454 A1 Feb. 14, 2013

Related U.S. Application Data

(60) Provisional application No. 61/505,250, filed on Jul. 7, 2011.

(51) Int. Cl.
*G08B 17/00* (2006.01)
*G01K 11/06* (2006.01)

(52) U.S. Cl.
CPC .................................... *G01K 11/06* (2013.01)
USPC ........ 340/584; 340/586; 340/540; 340/572.1; 340/539.1

(58) Field of Classification Search
CPC ........... G01K 11/06; G01K 1/02; G01K 1/24; G01K 2207/06; G01K 2207/04; G01D 9/005; G06K 19/0717
USPC ........ 340/584, 585, 586, 588, 589, 10.1, 540, 340/572.1–572.9, 539.1, 539.11, 500; 702/136; 338/13
See application file for complete search history.

(56) References Cited

U.S. PATENT DOCUMENTS

| | | | | |
|---|---|---|---|---|
| 6,970,100 | B2 * | 11/2005 | Lovegreen et al. | 340/870.17 |
| 7,011,037 | B2 * | 3/2006 | Cooperman | 116/216 |
| 8,028,533 | B2 * | 10/2011 | Palin et al. | 62/66 |
| 8,618,914 | B2 * | 12/2013 | Bachman et al. | 340/10.1 |
| 2008/0103723 | A1 * | 5/2008 | Burdett et al. | 702/130 |
| 2008/0272131 | A1 * | 11/2008 | Roberts et al. | 220/592.25 |
| 2009/0303052 | A1 * | 12/2009 | Aklepi et al. | 340/573.2 |
| 2009/0322541 | A1 * | 12/2009 | Jones et al. | 340/584 |

* cited by examiner

*Primary Examiner* — Anh V La
(74) *Attorney, Agent, or Firm* — Porzio, Bromberg & Newman, P.C.

(57) ABSTRACT

A system for remotely monitoring change in condition. A condition indication device can include an indication area and an identification area. The indication area can include one or more of a freeze/thaw indicator, heat temperature marker or high temperature indicator. A reader reads information from the indication area and the identification area. Information is forwarded from the reader using a remote network to a remote recognition device. In one embodiment, the reader takes a picture of the indicator device and the picture is forwarded as information to the remote recognition device. A conductivity changes to solutions and/or emulsions together with color changes in the remote indicating device can remotely monitor the change in condition. The information obtained at the remote recognition device can be used to determine a status, location and time for a point in transit or storage of the condition indication device.

20 Claims, 7 Drawing Sheets

SYSTEM FOR REMOTELY MONITORING CHANGES IN CONDITION

CROSS REFERENCE TO RELATED APPLICATION

This application claims the benefit of U.S. Provisional Patent Application No. 61/505,250, filed Jul. 7, 2011, the entirety of which is hereby incorporated by reference into this application.

BACKGROUND OF THE INVENTION

Description of Related Art

In the transfer or storage of many commercial products, food items or home goods, it is desirable to have some manner of indicating whether items that require freezer temperatures for stability, activity or the like have previously been thawed. Similarly, it would be very beneficial to know whether material that is stored frozen is allowed to thaw and subsequently is refrozen. Furthermore, it would be very beneficial to know whether material has been cooled below and then heated above a threshold temperature other than the freezing temperature (i.e., above or below the freezing temperature). Likewise it is desirable to indicate whether products have been subjected to high temperatures that might affect stability or activity.

Freeze-thaw indicators are known. For example, U.S. Pat. No. 4,163,427 discloses an apparatus in which melting ice is used to activate a dye formation in producing a color indication of thawing. A related invention uses a pigment rather than a dye to indicate a transition over the threshold temperature. U.S. Pat. Nos. 6,694,913 and 7,011,037 are directed to changed condition indicators. As well, U.S. Pat. No. 7,770,534 is directed to a system and method for indication of temperature exposures beyond a set of predetermined limits that employs the salts of weak acid-strong base or of a strong acid-weak base compound as reactants.

Another known device is marketed under the name "Cold-Mark Freeze Indicators." This device comprises three liquids that provide a color change upon extended exposure below a certain temperature and another color change upon extended exposure above the temperature.

It is desirable to provide a system for remotely monitoring changes in condition.

SUMMARY OF THE INVENTION

The present invention relates to a system for remotely monitoring change in condition. For example, the change in condition can be a change in temperature such as a change above or below a predetermined temperature or a freezing condition. The present invention provides a device for indicating a transition from a threshold temperature. In one embodiment, an alarm can be activated when the transition event occurs.

In one embodiment, within a freeze/thaw indicator device, a water solution of a first reactive material or an absorbent substrate is saturated and dried with a first reactive material, that reacts to produce a color when contacted with a second reactive material. The second reactive material is a water solution of electrolyte contained within containers (e.g., microcapsules) in the freeze/thaw indicator. When subjected to freezing temperatures, the water expands, the microcapsules break and release the second reactant water solution (on thawing), and finally the two reactive materials combine to produce a color.

Alternatively or in combination with the freeze/thaw indicator device, a high temperature indicator can be used. In this embodiment, the microcapsule is designed to melt when subjected to high temperatures. When the microcapsules melt, they release a reactive solution into a different predetermined water solution to produce a color. The color produced by the high temperature indicator can be different than the color selected for the freeze/thaw indicator. Both the freeze/thaw indicator device and the high temperature indicator can be made separately, or combined into any shape or size indicator as desired.

A condition indication device can include an indication area and an identification area. The indication area can include one or more of a freeze/thaw indicator, heat temperature marker or high temperature indicator. A reader reads information from both the indication area and the identification area. Information from the indication area can include information on a temperature condition. Information from the identification area can include a bar code. Other information can also be forwarded to the reader including information on the location of the condition indication device and time at which the information was obtained. Information is forwarded from the reader using a remote network to a remote recognition device. In one embodiment, the reader takes a picture of the condition indication device and the picture is forwarded as information to the remote recognition device. The remote recognition device performs pattern recognition on the information obtained from the picture of the indication area and the identification area to identify the pattern of the indication area and the pattern of the identification area. The information obtained at the remote recognition device can be used to determine a status, location and time for a point in transit or storage of an indicator device.

In one embodiment, the system for remotely monitoring change in condition is associated with a vaccine. For example, an indicator device can be coupled to syringe or package of vaccine vials. The syringe or package of vaccine can be related for example to pharmaceuticals and biologicals such as for example, insulin, antibiotics, immuni-globulins, emulsions, protein assays, trans-plants and the like. The invention will be more fully described by reference to the following drawings.

DETAILED DESCRIPTION

Reference will now be made in greater detail to a preferred embodiment of the invention, an example of which is illustrated in the accompanying drawings. Wherever possible, the same reference numerals will be used throughout the drawings and the description to refer to the same or like parts.

Figure 1:
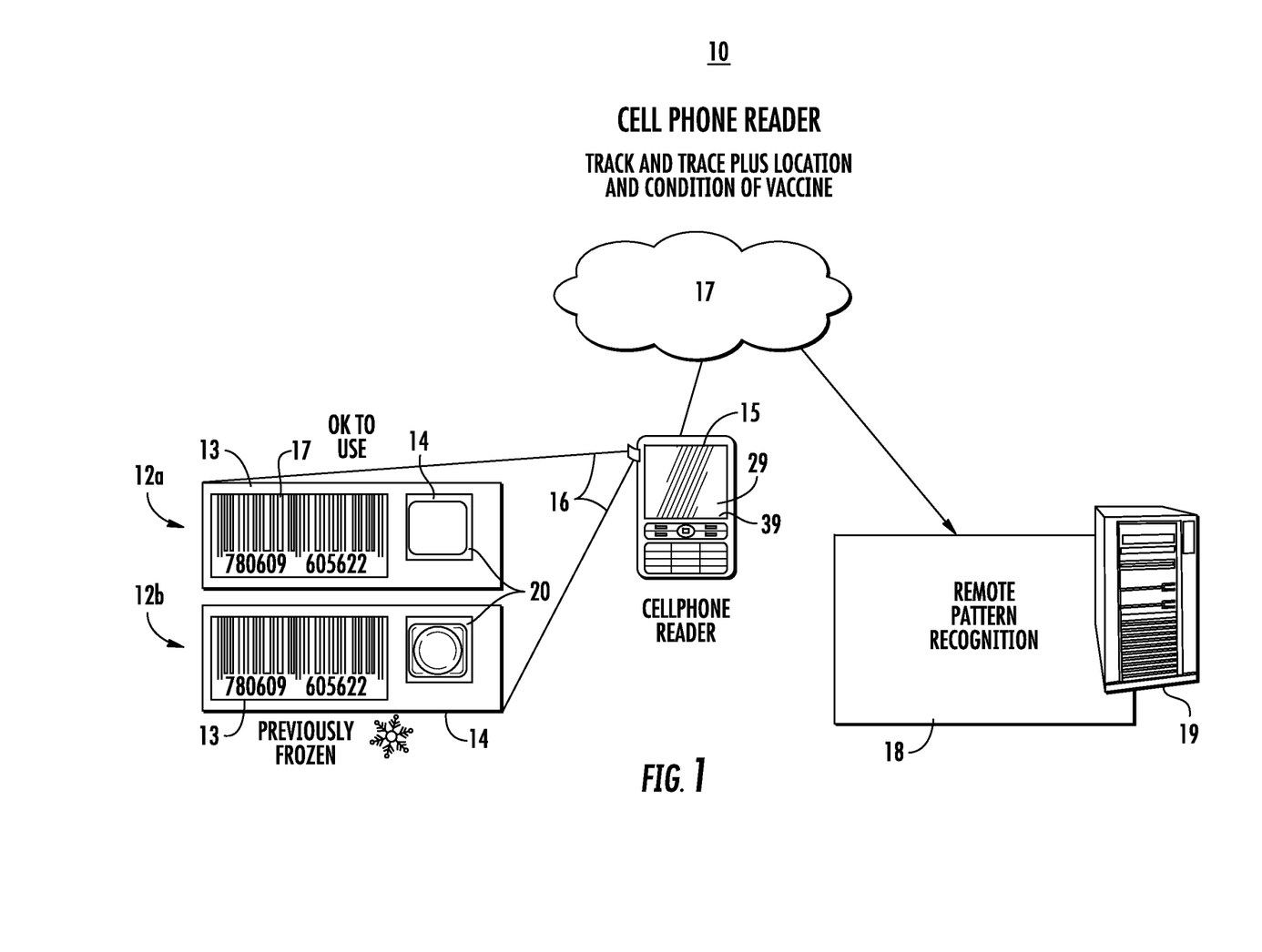
FIG. 1 is a schematic diagram of a system for remotely monitoring change in condition.
Figure 2A:
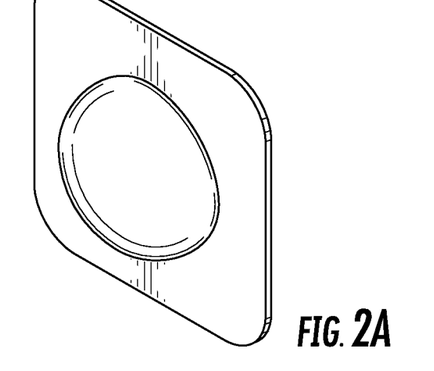
FIG. 2A is a perspective view of an indicator device used in the system of FIG. 1.
Figures 2B, 2C:
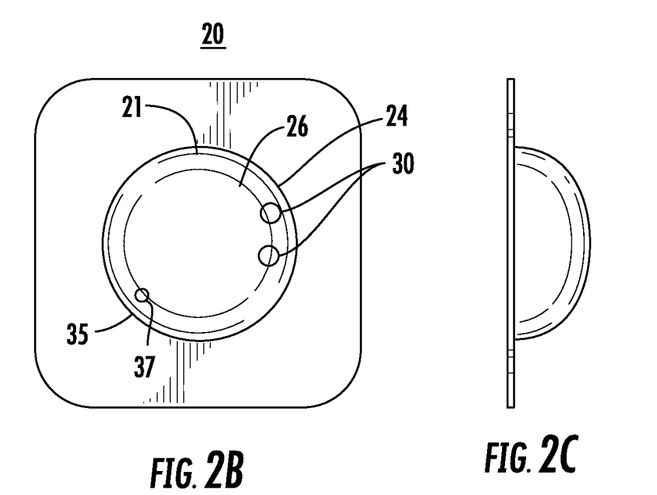
FIG. 2B is a front elevational view of the indicator device of FIG. 2A.
FIG. 2C is a side elevational view of the indicator device of FIG. 2A.
Figure 2D:
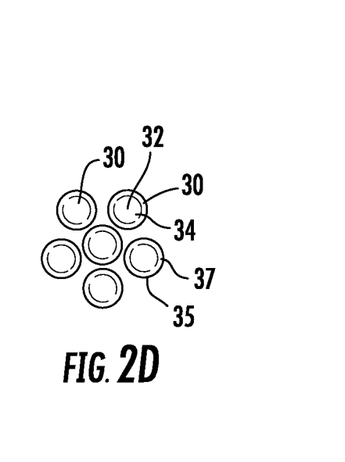
FIG. 2D is a schematic diagram of capsules contained in the indicator device.

FIG. 1 is a schematic diagram of system for remotely monitoring changes in condition 10 in accordance with the teachings of the present invention. Condition indication device 12 includes indication area 14 and identification area 13. In one embodiment, identification area 13 includes bar code 17. Reader 15 reads information 16 from condition indication device 12. For example, information 16 can include information from indication area 14 and identification area 13. Information from indication area 14 can include information on the temperature condition of condition indication device 12. Information 16 can also include information on the location of condition indication device 12, such as obtained from a global positioning system (GPS), and time at which information 16 was obtained. Information 16 is forwarded using remote network 17 to remote recognition device 18. In one embodiment reader 15 takes a picture of condition indication device 12 using camera 29 and the picture is forwarded as information 16 to remote recognition device 18. In this embodiment, remote recognition device 18 performs pattern recognition on information 16 obtained from the picture of indication area 14 and identification area 13 to identify the pattern of indication area 14 and the pattern of identification area 13, thereby determining a status, location and time for a point in transit or storage of condition indication device 12. Remote recognition device 18 can include storage area 19 for storing information 16 and/or information 16 can be printed at remote recognition device 18.

Condition indication device 12 can provide an irreversible visual indication of for example, room temperature to a freeze event, cold temperature to a freeze event, freezing temperature to a thaw event, room temperature to greater than about 37.8 degrees C. (100 degrees F.) or temperature of about −20 degrees C. to greater than about 37.8 degrees C. In one embodiment, condition indication device 12 includes color change indicator 20 in indication area 14. Color change indicator 20 changes color depending on a status of the object being monitored by condition indication device 12.

In one embodiment, color change indicator 20 can include housing 21 as shown in FIGS. 2A-2D. First reactant 26 is provided within housing 21. First reactant 26 can be located within housing 21 in various ways. For example, first reactant 26 can be applied as a solution, or directly to surface 24 or first reactant 26 may be applied to a piece of material, such as filter paper, and the material placed inside housing 21. In addition to filter paper, other carriers may also be used with the present invention.

Capsule 30 is located within housing 21. Capsule 30 contains second reactant 32. Capsule 30 also contains a liquid 34. Liquid 34 is chosen such that it expands upon freezing. A preferred form of liquid 34 is an aqueous solution. Capsule 30 is designed such that it will fracture when liquid 34 freezes. After fracture, second reactant 32 can escape capsule 30 to mix with first reactant 26. This will not occur, however, while color change indicator 20 is in a frozen condition. When color change indicator 20 enters a thawed condition, liquid 34 melts/thaws, releasing second reactant 32. Second reactant 32 then mixes with first reactant 26 to form a pigment, indicating that color change indicator 20 has made the transition from a frozen condition to a thawed condition. The rigidity of housing 21 can function as a means to protect against crushing of capsule 30. Housing 21 can include second capsule 35 that will melt at a predetermined high temperature. Second capsule 35 contains second reactant 32 or alternatively contains third reactant 37. After melting, second reactant 32 or third reactant 37 can escape capsule 30 to mix with first reactant 26 to produce a colored pigment. Housing 21 can have various shapes for example, housing 21 can be a capsule, a blister on a label or a sealed tube. An example changed condition indicator device is described in U.S. Pat. No. 770,534 hereby incorporated by reference in its entirety into this application.

Referring to FIG. 1, reader 15 can be a wireless phone, such as a cell phone or any hand held device capable of receiving information from condition indication device 12 and/or including a camera for obtaining picture information of condition indication device 12. Remote network 17 can be any network, typically a wireless network, which is compatible with reader 15. Remote network 17 can be any wireless data connection available on the wireless phone, such as, for example, cellular data, Bluetooth, wireless local area network, or other connections. Remote network 17 can also include the Internet.

Condition indication device 12a indicates that there has not been any change in condition of color change indicator 20 and a product associated with condition indication device 12a, such as a vaccine, would not have a change of condition. Condition indication device 12b indicates that there has been a change in condition of being previously frozen as determined by color change indicator 20. Remote recognition device 18 upon receiving information 16 from condition indication device 12a and condition indication device 12b can determine the status of condition indication device 12a and condition indication device 12b. Upon determining the status of condition indication device 12b as having a change of condition, remote recognition device 18 can trigger alarm 39 at reader 15.

Figure 3:
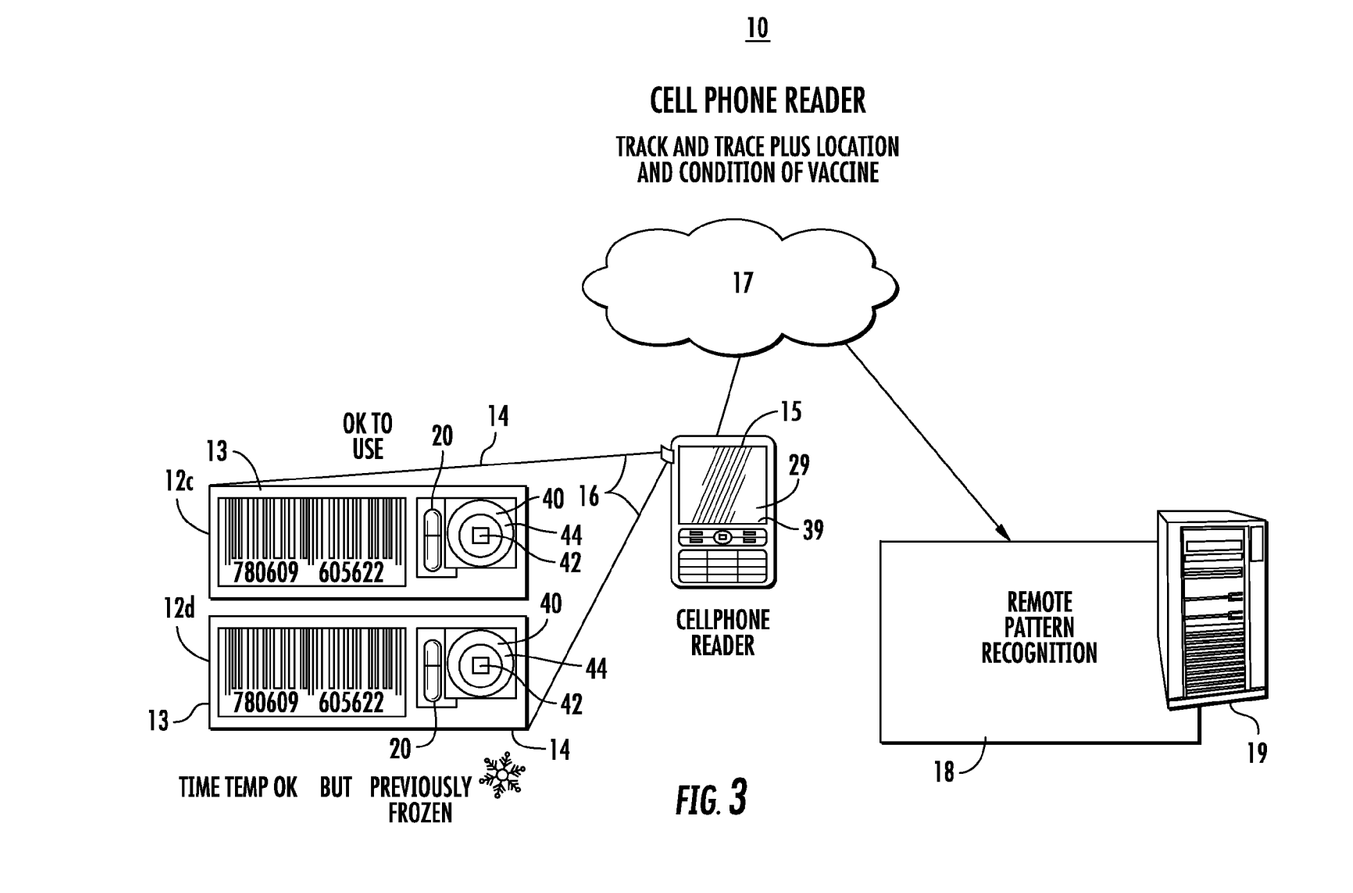
FIG. 3 is a schematic diagram of an alternative embodiment of a system for remotely monitoring change in condition.

FIG. 3 illustrates an alternative embodiment including color change indicator 20 and heat temperature marker 40. In this embodiment, color change indicator 20 is in the shape of a capsule. It will be appreciated that color change indicator 20 could be in the shape of a blister as shown in FIG. 1 or any other desirable shape. Heat temperature marker 40 can monitor changes in temperature above a predetermined temperature by increasing the hue of the color of inner square 42 until it blends with outer ring 44.

Condition indication device 12c indicates that there has not been any change in condition of color change indicator 20 or heat temperature marker 40 and a product associated with condition indication device 12c would not have a change of condition. Condition indication device 12d indicates that there has not been any change of condition of heat temperature marker 40 and there has been a change in condition of being previously frozen as determined by color change indicator 20. Remote recognition device 18 upon receiving information 16 from condition indication device 12c and condition indication device 12d can determine the status of condition indication device 12c and condition indication device 12d. Upon determining the status of condition indication device 12d as having a change of condition, remote recognition device 18 can trigger alarm 39 at reader 15.

Figure 4:
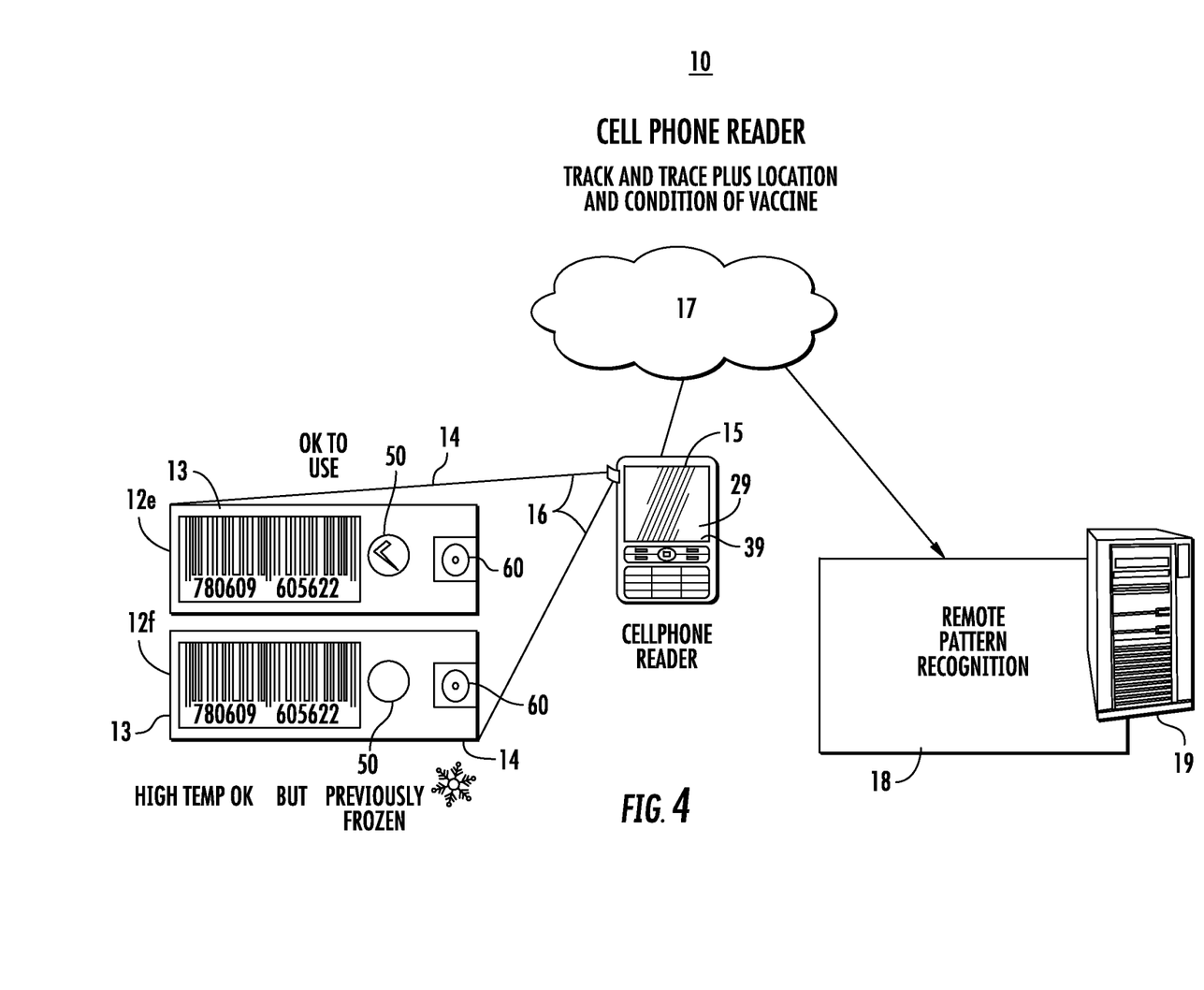
FIG. 4 is a schematic diagram of an alternative embodiment of a system for remotely monitoring change in condition.

FIG. 4 illustrates an alternative embodiment including color change indicator 50 and high temperature indicator 60. Color change indicator 50 removes color of color change indicator 50 to indicate a freezing or thawing event. High temperature indicator 60 can indicate a change in temperature above a predetermined temperature. For example, high temperature indicator 60 can indicate a change in temperature above about 37.8 degrees C.

Condition indication device 12e indicates that there has not been any change in condition of color change indicator 20 or high temperature indicator 60 and a product associated with condition indication device 12e would not have a change of condition. Indication device 12f indicates that there has not been any change of condition of high temperature indicator 60 and there has been a change in condition of color change indicator 50 as being previously frozen. Remote recognition device 18 upon receiving information 16 from condition indication device 12e and condition indication device 12f can determine the status of condition indication device 12e and condition indication device 12f. Upon determine the status of condition indication device 12f as having a change of condition, remote recognition device 18 can trigger alarm 39 at reader 15.

Figure 5:
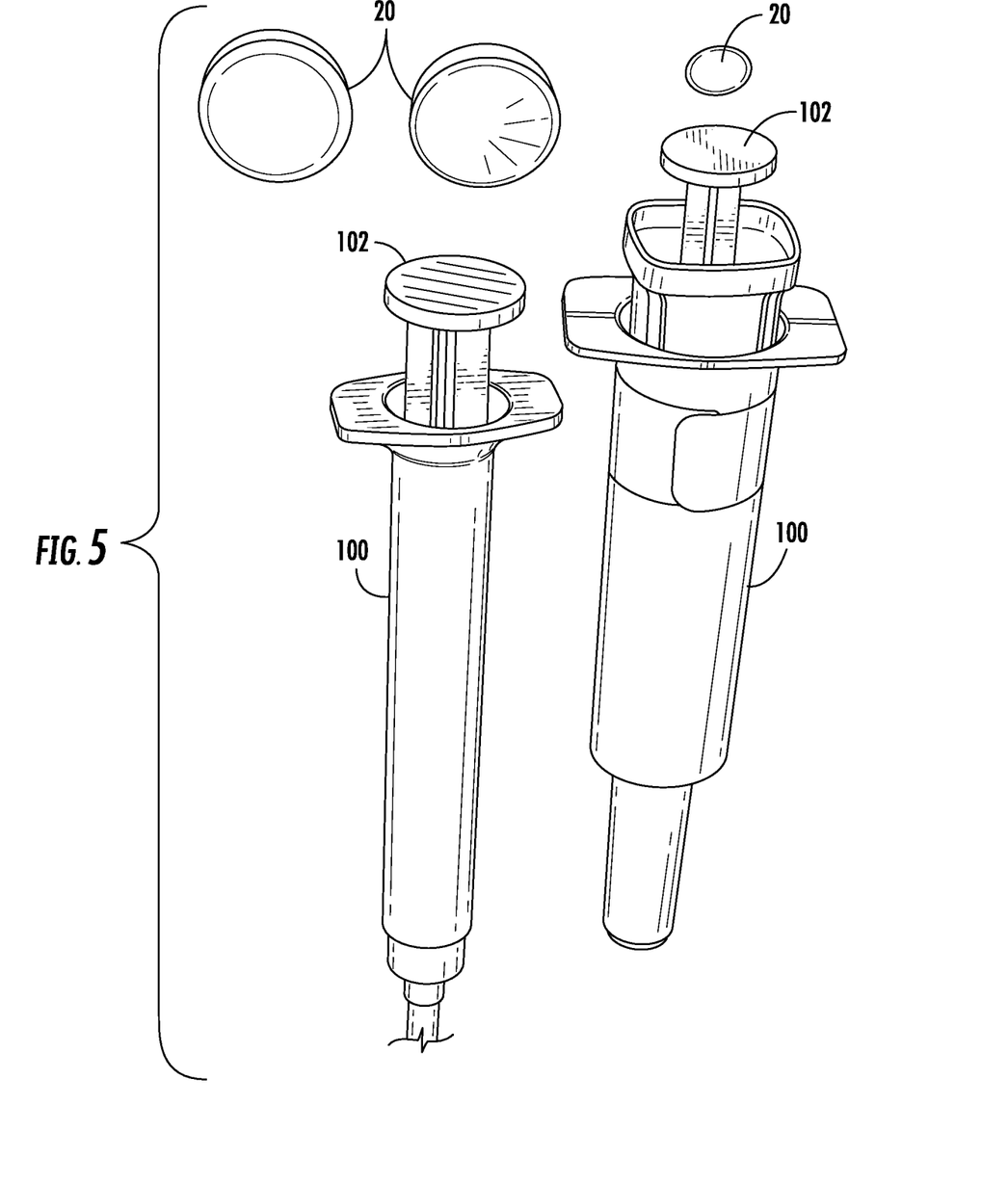
FIG. 5 is a schematic diagram showing attachment of a color change indicator to a syringe.

FIG. 5 is a schematic diagram showing attachment of color change indicator 20 to syringe 100. In this embodiment color indicator device 20 is formed to have a similar shape to plunger 102 of syringe 100 for attachment thereto.

Figure 6:
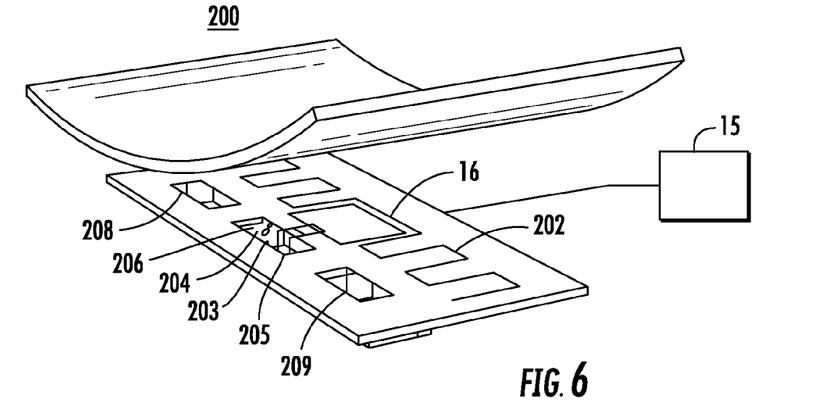
FIG. 6 is a schematic diagram of an alternative embodiment of an indicator device.

FIG. 6 illustrates an alternative embodiment of indicator device 200. Indicator device 200 can be used in indication area 14 in system 10. Indicator device 200 includes Radio Frequency Identification (RFID) circuit 202. RFID circuit 202 measures conductivity from indicator area 203. For example, indicator area 203 can include well 204 containing conduction measuring solution 205. For example, conduction measuring solution 205 can be a salt solution having a predetermined conductivity. RFID circuit 202 measures conductivity from conduction measuring solution 205. Capsules 206 can be provided with conduction measuring solutions. Typically, conductivity is zero when conduction measuring solution 205 is frozen or heated above the melting point of capsules 206. When capsules 206 freeze or melt, capsules 206 break releasing ions that change conductivity of conduction measuring solution 205. Conduction measuring solution 205 can have a different conductivity value when thawing or for variable changes in temperature. RFID circuit 202 can forward information 16 on conductivity to reader 15. Indicator device 200 can also include high temperature indicator 208 and freeze/thawing temperature indicator 209. High temperature indicator 208 and freeze/thawing indicator 209 can be color indicators, as described above.

Figure 7:
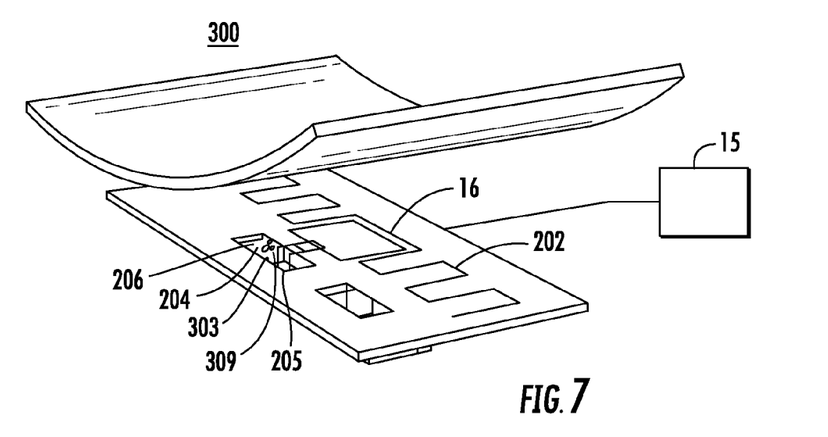
FIG. 7 is a schematic diagram of an alternative embodiment of an indicator device.

FIG. 7 illustrates an alternative embodiment of indicator device 300. Indicator device 300 can be used in indication area 14 in system 10. Indicator device 300 includes Radio Frequency Identification (RFID) circuit 202. RFID circuit 202 measures conductivity from indicator area 303. For example, indicator area 303 can include well 204 containing conduction measuring solution 205. For example, conduction measuring solution 205 can be a salt solution having a predetermined conductivity. RFID circuit 202 measures conductivity from conduction measuring solution 205. Capsules 206 can be provided with conduction measuring solutions. When capsules 206 freeze or melt, capsules 206 break releasing ions which change conductivity of conduction measuring solution 205. Conduction measuring solution 205 can have a different conductivity value when thawing or over heating.

Indicator area 303 can include color temperature indicator 309. Color temperature indicator 309 can provide a first color if a freeze/thaw condition is determined or a second color if a high temperature condition is determined. Color indicator 309 can be a color indicator, as described above.

Figure 8:
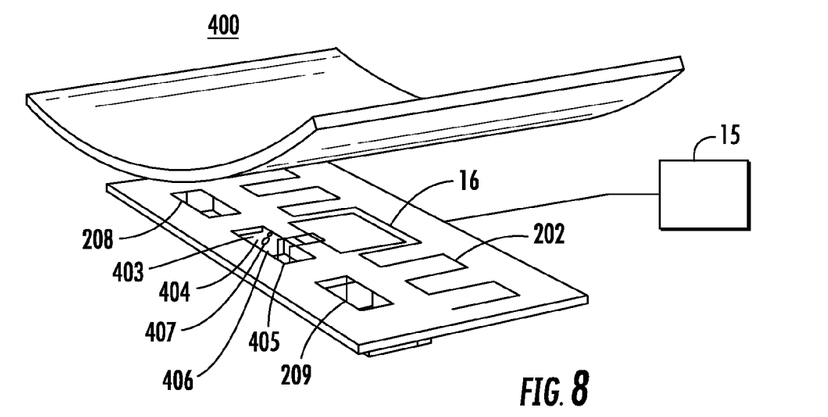
FIG. 8 is a schematic diagram of an alternative embodiment of an indicator device.
Figure 9A:
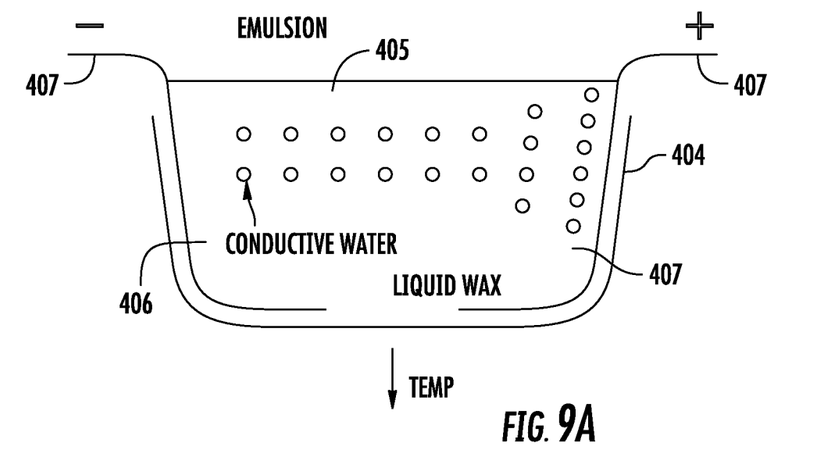
FIG. 9A is a schematic diagram of a solidified emulsion contained in a well of an indication device.
Figure 9B:
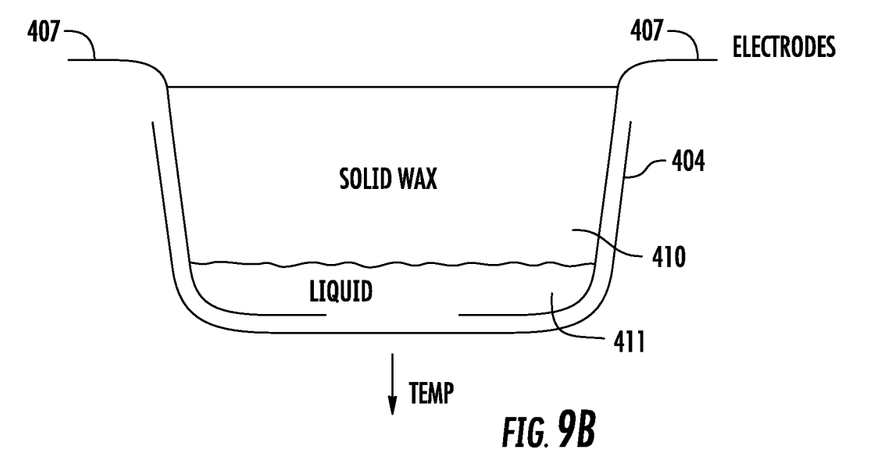
FIG. 9B is a schematic diagram of a frozen emulsion contained in a well of an indication device.

FIG. 8 illustrates an alternative embodiment of indicator device 400. Indicator device 400 can be used in indication area 14 in system 10. Indicator device 400 includes Radio Frequency Identification (RFID) circuit 202. RFID circuit 202 measures conductivity from indicator area 403. For example, indicator area 403 can include well 404 containing a conduction measuring solution 405. The conduction measuring solution 405 can be an emulsion of an emulsified salt solution. RFID circuit 202 measures conductivity from conduction measuring solution 405. RFID circuit 202 can forward information 16 on conductivity to reader 15. For example, water-based salt solution 406 emulsified with emulsion material 407, to form conduction measuring solution 405, as shown in FIG. 9A. Emulsion material 407 can be an oil, wax or fatty material, and/or any other hydrophobic material. Electrodes 409 can connect to RFID circuit (not shown). Conduction measuring solution 405 of the emulsion can be cooled until the emulsion is solidified to form solidified emulsion 410. In this state, the solidified conductivity at conduction measuring solution 405 measured in well 404 is minimal or zero. When the solidified conduction measuring solution 405 is frozen, water or liquid 411 is separated from the solid emulsion, as shown in FIG. 9B. In this state, a conductivity of conduction measuring solution 405 measured in well 404 is from the water or liquid 411 separated from the emulsion and has a different and increased conductivity value over the conductivity of a non-frozen or thawed conduction measuring solution 405. Accordingly, a measured conductivity value in well 404 can be an indication of a freeze event.

Alternatively, if the solidified emulsion 410 is heated above the melting point of the continuous phase of solidified emulsion 410, the emulsion will break and the emulsified conducting water solution will separate out. In this state, a conductivity of conduction measuring solution 405 measured in well 404 is from the water or liquid 411 separated from the emulsion and has a different and increased conductivity value over the conductivity of a non-frozen or heated conduction measuring solution 405.

The invention can be further illustrated by the following examples thereof, although it will be understood that these examples are included merely for purposes of illustration and are not intended to limit the scope of the invention unless otherwise specifically indicated. All percentages, ratios, and parts herein, in the Specification, Examples, and Claims, are by weight and are approximations unless otherwise stated.

Example 1

Refined Coconut Oil was emulsified with salted distilled water and allowed to set at room temperature to determine if any separation would occur. None occurred, and the material had a reading of 3 megohms resistance. The emulsion was then frozen and the frozen material still showed 3 megohms resistance to form solidified emulsion. On thawing, however, the salted water separated from the coconut oil and the reading obtained was 2 kilohms. This was irreversible and varied only if the water was refrozen and thawed cycling between 3 megohms (frozen) and 2 kilohms (thawed).

The same results were obtained when the emulsion was heated to just above the melting point of the coconut oil, with same resistance readings and the same irreversibility.

The same test was made with commercial salted butter with results identical to those obtained with the coconut oil, both on the freezing and melting extremes.

All patents and applications discussed in this application are incorporated by reference herein in their entirety.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A system for remotely monitoring changes in condition comprising:
    a condition indication device including an indicator and an identification, said indicator includes a color indicator and a conductivity measuring indicator, said color indicator changing a color of the color indicator if there has been a change of condition, said conductivity measuring indicator has a different value if there is a change of condition;
    a reader, said reader obtaining first information directed to said indicator and said identification; and
    a remote recognition device, receiving said first information and determining a status of said condition indication device.

2. The system of claim 1 wherein said identification is a bar code.

3. The system of claim 1 wherein said reader obtaining second information of one or more of a location of the condition indication device or a time of said reader obtaining said first information.

4. The system of claim 1 wherein said reader includes a camera for inputting said first information, the first information is the color from the color indicator and said remote recognition device performs pattern recognition on said first information.

5. The system of claim 1 wherein said remote recognition device includes storage for storing said first information.

6. The system of claim 1 wherein said color indicator provides an irreversible visual indication of a condition selected from the group consisting of a room temperature to a freeze event, cold temperature to a freeze event, freezing temperature to a thaw event, room temperature to greater than about 37.8 degrees C. and a temperature of about −20 degrees C. to greater than about 37.8 degrees C.

7. The system of claim 1 wherein said color indicator comprises a housing; a solution or a first surface, at least a portion of said first surface being of a first color; a first reactant located in the solution or on said first surface within said housing; a capsule containing a liquid and a second reactant, said capsule being located within said housing; wherein said liquid freezes at a first threshold temperature and expands upon freezing whereby said capsule fractures from the liquid expansion and wherein said first and said second reactants combine on said first surface to produce a pigment of a second color upon mixing, said first and said second colors being different.

8. The system of claim 7 further comprising a second capsule located within said housing and optionally a third reactant; wherein the formulation of said second capsule comprises a component that melts at a second threshold temperature and wherein said second capsule contains said second reactant or said optional third reactant; wherein when said optional third reactant is present, said third and first reactants combine to produce a pigment of a third color upon mixing, said third color being different from said first color.

9. The system of claim 1 further comprising a heat temperature marker, said reader obtaining heat temperature marker information from said heat temperature marker.

10. The system of claim 1 further comprising a high temperature indicator, said high temperature indicator providing high temperature information if the temperature is greater than a high temperature threshold, said reader obtaining said high temperature information from said high temperature indicator.

11. The system of claim 1 wherein said color indicator includes a first color indicator and a second color indicator, said first color indicator indicating a freeze/thaw event and said second color indicator indicating a high temperature.

12. The system of claim 1 wherein the conductivity measuring indicator includes a RFID circuit for measuring conductivity of a conduction measuring solution.

13. The system of claim 1 wherein said condition indication device is attached to a vaccine.

14. A condition monitoring device comprising:
    a first color indicator indicating a freeze/thaw event;
    a second color indicator indicating a high temperature; and
    a conductivity measuring indicator indicating a change in conductivity, the conductivity measuring indicator includes a RFID circuit for measuring conductivity of a conduction measuring solution,
    wherein if any of the color indicator indicating a freeze/thaw event, the color indicator indicating a high temperature and the conductivity measuring indicator are active the condition monitoring device indicates a change of condition.

15. The condition monitoring device of claim 14 wherein the first color indicator and the second color indicator and the conductivity measuring indicator are positioned in separate wells of a housing.

16. The condition monitoring device of claim 14 wherein the first color indicator and the second color indicator and the conductivity measuring indicator are positioned in a well of a housing, the first color indicator being a different color than the second color indicator.

17. The condition monitoring device of claim 14 wherein the conductivity measuring indicator comprises an emulsion of a water-based salt solution and a material of oil, wax fatty material, and or any other hydrophobic material wherein the conductivity measuring indicator has a different conductivity for a freeze event or a high temperature event when the different conductivity measured at the conductivity measuring indicator the conductivity measuring is active.

18. A condition monitoring device for monitoring a vaccine comprising:
    a condition indication device associated with the vaccine including an indicator and an identification, said indicator includes a color indicator and a conductivity measuring indicator, said color indicator changing a color of the color indicator if there has been a change of condition, said conductivity measuring indicator has a different value if there is a change of condition;
    a reader, said reader obtaining first information directed to said indicator and said identification; and
    a remote recognition device, receiving said first information and determining a status of said condition indication device.

19. The device of claim 15 wherein said color indicator provides an irreversible visual indication of a condition selected from the group consisting of a room temperature to a freeze event, cold temperature to a freeze event, freezing temperature to a thaw event, room temperature to greater than about 37.8 degrees C. and a temperature of about −20 degrees C. to greater than about 37.8 degrees C.

20. The device of claim 15 wherein the color indicator includes a first color indicating a freeze/thaw event, and a second color indicator indicating a high temperature.

* * * * *